US009004584B1

(12) United States Patent
Cadena

(10) Patent No.: US 9,004,584 B1
(45) Date of Patent: Apr. 14, 2015

(54) OPEN ROOF CONSTRUCTION FOR A VEHICLE AND WIND DEFLECTOR FOR USE THEREIN

(71) Applicant: Inalfa Roof Systems Group B.V., Venray (NL)

(72) Inventor: Gaston Edgar Valencia Cadena, Lake Orion, MI (US)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 14/152,040

(22) Filed: Jan. 10, 2014

(51) Int. Cl.
*B60J 7/22* (2006.01)
(52) U.S. Cl.
CPC ............................. *B60J 7/22* (2013.01)
(58) Field of Classification Search
CPC .................................. B60J 7/22; B60J 7/223
USPC ........................................................ 296/217
See application file for complete search history.

(56) References Cited

U.S. PATENT DOCUMENTS

| 6,669,277 | B2 * | 12/2003 | Farber et al. | 296/217 |
| 2009/0309393 | A1 * | 12/2009 | Pihale et al. | 296/217 |
| 2012/0299336 | A1 * | 11/2012 | Lin | 296/217 |

FOREIGN PATENT DOCUMENTS

DE         10137363         11/2002

* cited by examiner

*Primary Examiner* — Dennis H Pedder
(74) *Attorney, Agent, or Firm* — Steven M. Koehler; Westman, Champlin & Koehler, P.A.

(57) ABSTRACT

An open roof construction for a vehicle having a roof opening comprises at least a closure member supported by the stationary part and configured to open and close the roof opening. A wind deflector is positioned near the front of the roof opening and is movable between an ineffective position below the fixed roof and an effective position projecting above the fixed roof. The wind deflector includes flexible wind deflecting material attached to an upper elongate element. The wind deflecting material is also connected at its lower end to a stationary part. An intermediate element is attached to the material between its upper and lower ends and extends along substantially the width of the wind deflecting material. At least a part of the intermediate element is biased toward a first position is displaced in a direction toward an edge of the roof opening when the wind deflector to the effective position.

20 Claims, 8 Drawing Sheets

OPEN ROOF CONSTRUCTION FOR A VEHICLE AND WIND DEFLECTOR FOR USE THEREIN

BACKGROUND

The discussion below is merely provided for general background information and is not intended to be used as an aid in determining the scope of the claimed subject matter.

Aspects of the invention relates to an open roof construction for a vehicle having a roof opening in its fixed roof, comprising a stationary part, at least a closure member supported by the stationary part and adapted to close the roof opening in the fixed roof and to selectively open it by being moved at least rearwardly, and a wind deflector positioned near the front of the roof opening, said wind deflector being movable between an ineffective position below the fixed roof and an effective position projecting above the fixed roof, the wind deflector including flexible wind deflecting material attached at its upper end to an upper elongate element which is movably connected to the stationary part and extends at least along the front of the roof opening and the wind deflecting material being connected at its lower end to the stationary part, the wind deflecting material being provided with an intermediate elongate element attached to the wind deflecting material between its upper and lower ends and extending along substantially the width of the wind deflecting material.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the invention includes at least a part of the intermediate elongate element being biased toward a position spaced from the edge of the roof opening and is displaced in a direction toward the edge of the roof opening when the wind deflector is moved from its ineffective to its effective position.

Another aspect of the invention comprises the intermediate elongate element being configured so as to have a first shape when the wind deflector material is in the ineffective position of the wind deflector (not being taut) and in a second shape when the wind deflector material 6 is in the effective position of the wind deflector (taut). The intermediate elongate element or portions thereof, are configured to be resilient so as to return to the first shape after being in the second shape.

Due to this movement of the intermediate elongate element, the risk of the closure element catching the flexible wind deflecting material is reduced as it is moved away from the edge of the roof opening by the intermediate elongate element when the wind deflector moves to the ineffective position. Thus, the wind deflector can be positioned close to the front edge of the roof opening which is favorable in view of reducing aerodynamic noises.

In a particular embodiment, the roof opening is substantially rectangular having a front side and two lateral sides, the upper and intermediate elongate elements having a central part extending substantially parallel to the front side of the roof opening and end parts extending, in plan view, substantially parallel to the lateral sides of the roof opening, the flexible wind deflecting material being attached both to the central part and to the end parts of the elongate element.

In this manner, the movement of the flexible wind deflecting material can be controlled along its whole cross section.

In this embodiment, the intermediate elongate element may be flexible and at least the side portions may be biased in an inward direction away from the adjacent edges of the roof opening.

In this way, the side edges of the flexible wind deflecting material can be moved away from the roof opening edge by an internal biasing force.

Additionally, or alternatively, the intermediate elongate element as a whole may be biased in a rearward direction away from the front edge of the roof opening, for example by means of a biasing device engaging the intermediate elongate element on the one hand and connected to at least one of the upper elongate element and the stationary part on the other hand.

This is a simple manner of moving the intermediate elongate element away from the front edge of the roof opening, in this case by an external biasing force.

In an embodiment, the upper elongate element is attached to the stationary part such that its movement to bring the wind deflector from its ineffective to its effective position causes a relatively small rearward displacement.

Due to this feature, it is possible to position the wind deflector close to the front edge of the roof opening when in the effective position without encountering obstructions when the wind deflector is moved to its ineffective position.

Such movement can be accomplished if the upper elongate element is movable by means of arms which are pivotable by means of lateral axes positioned substantially at the level of the fixed roof at the position of the front of the roof opening.

In this manner, there is no need for a complex mechanism, as the movement in a circle at the level of the axis of rotation is almost vertical, so almost without horizontal component.

If the intermediate elongate element is made of a heavy material, preferably metal, gravity force will hold the upper part of the flexible wind deflecting material substantially taut, and this will reduce the risk of clamping of the flexible material between the closure member and the fixed roof.

In a simple embodiment the intermediate elongate element is a rod, and may be attached to the flexible wind deflecting material on the front side thereof.

The intermediate elongate element may be provided in a pocket of the flexible wind deflecting material, but if the flexible wind deflecting material is made of a plastic containing material, the intermediate elongate element may also be attached to the flexible wind deflecting material by welding.

The intermediate elongate element may be loaded, for example clamped or biased, when the wind deflector is in its ineffective position in order to prevent rattling of the intermediate elongate element.

Further details and advantages of the open roof construction follow from the description below with reference to the attached drawings showing embodiments of the open roof construction by way of example.

DETAILED DESCRIPTION OF THE ILLUSTRATIVE EMBODIMENTS

Figure 1:
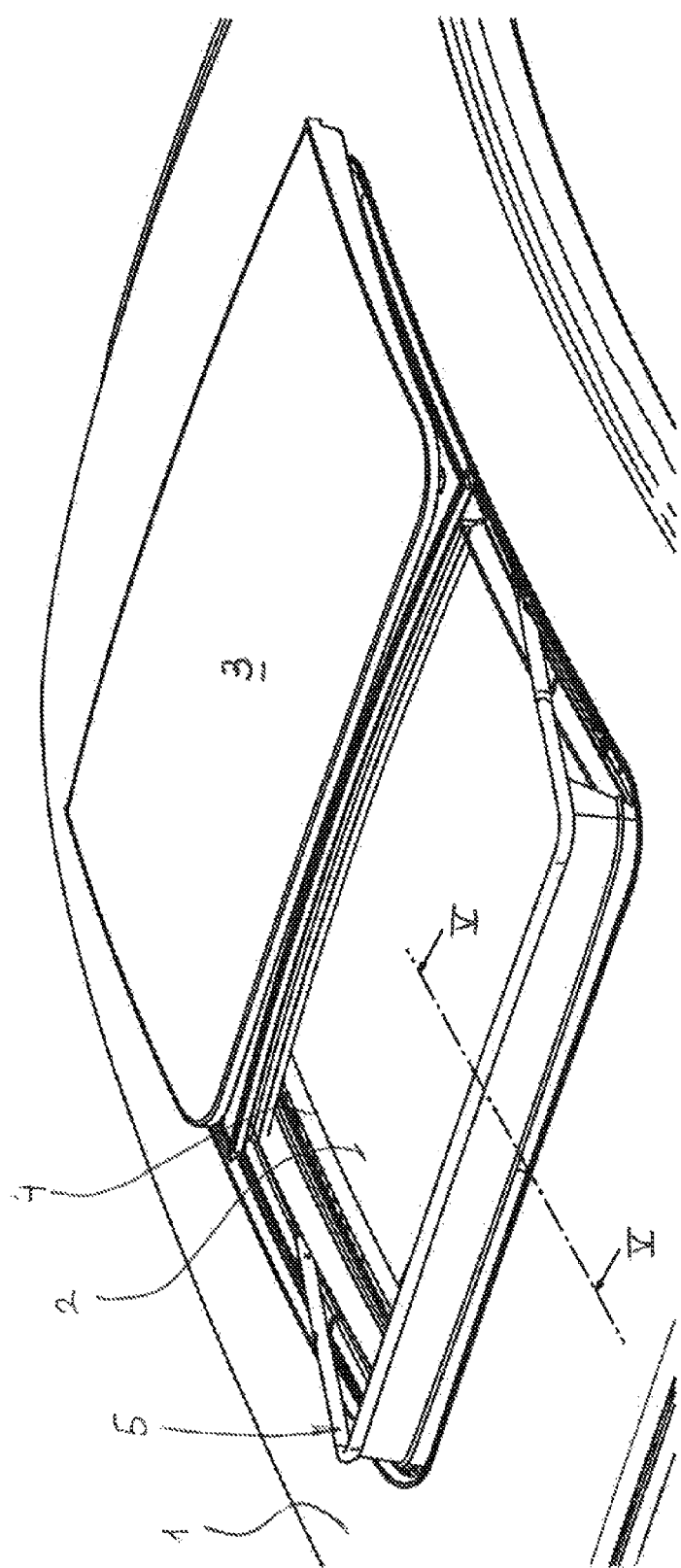
FIG. 1 is a partial perspective view of a vehicle roof comprising an open roof construction.

Referring to FIG. 1, a part of a vehicle having an open roof construction in its fixed roof 1 is illustrated schematically. Said vehicle, such as a passenger car, comprises a roof opening 2 in its fixed roof 1. The open roof construction comprises at least one closure member, such as panel 3, for example a glass or plastic, preferably at least partly transparent panel, as shown in FIG. 1. The closure panel 3 can be moved for closing and at least partially opening said roof opening 2 by at least a rearward movement, by an operating mechanism which is known in the art and not described further here.

The open roof construction includes a stationary part 4, such as a frame, for supporting parts of the open roof construction and for mounting the open roof construction to the fixed roof 1 of the vehicle.

Figures 2, 3:
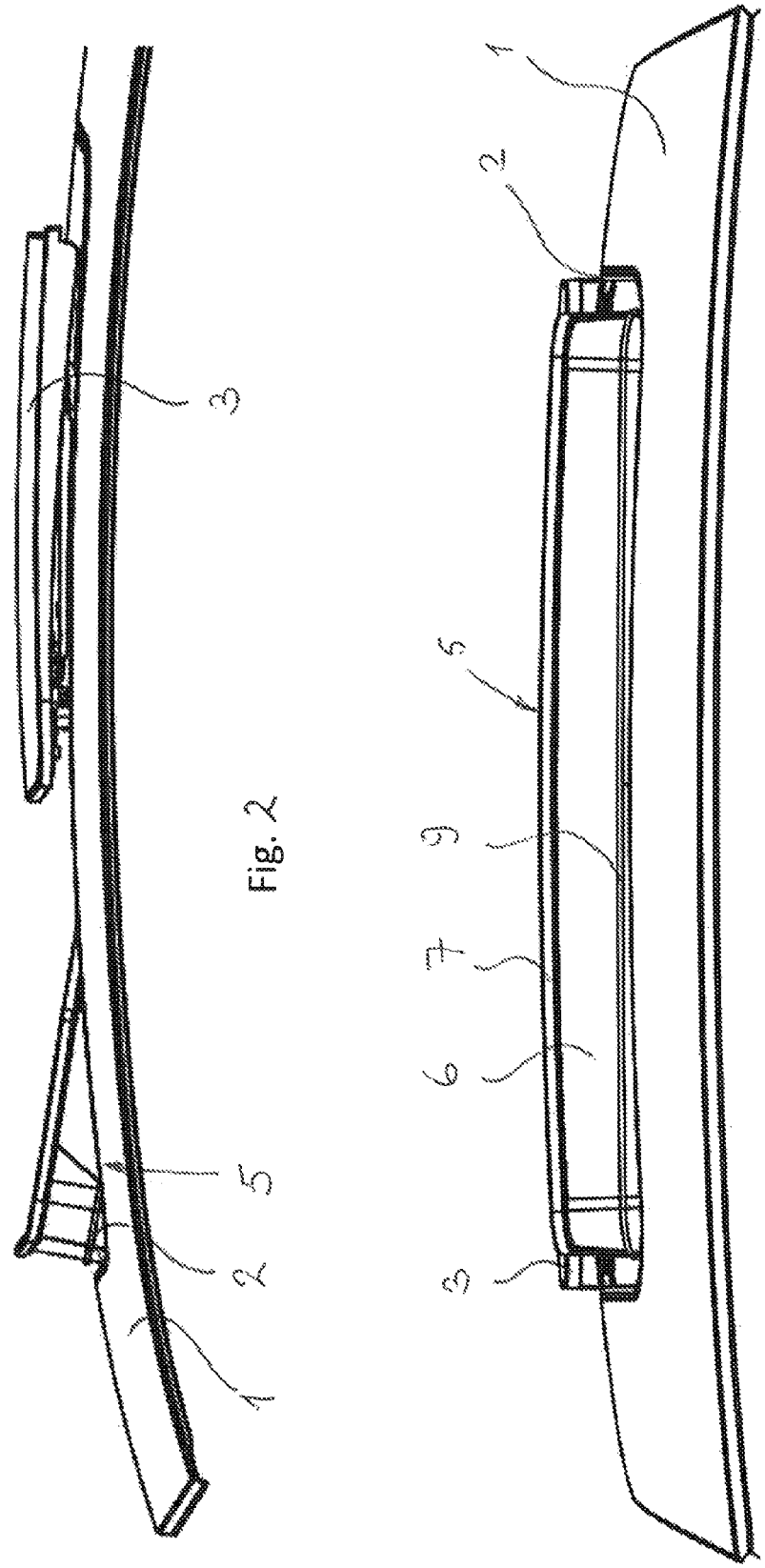
FIGS. 2 and 3 are a side view and front view, respectively, of the vehicle roof and open roof construction of FIG. 1.

To prevent or at least reduce aerodynamic noises when the vehicle is driving with the panel 3 in its rearwardly opened position, the open roof construction is provided with a wind deflector 5 positioned near the front of the roof opening 2. The wind deflector 5 is movable between an ineffective position below the fixed roof 1 and an effective position projecting above the fixed roof 1, see FIGS. 1-3. The wind 5 deflector includes flexible wind deflecting material 6 (a cloth-like material well-known in the art) attached at its upper end to an upper elongate element 7—or wind deflector body—which is movably connected to the stationary part 4 and extends at least along the front of the roof opening 2. The wind deflecting material 6 is connected at its lower end to the stationary part, for example through a lower elongate element 8 (see FIGS. 4-6). The wind deflecting material 6 is provided with an intermediate elongate element 9 attached to the wind deflecting material 6 between its upper and lower ends and extending along substantially the whole width of the wind deflecting material 6. In the effective position of the wind deflector 5, the intermediate elongate element 9 may be positioned above the level of the fixed roof 1 in front of the wind deflector 5, as is shown in FIG. 5.

Figure 4:
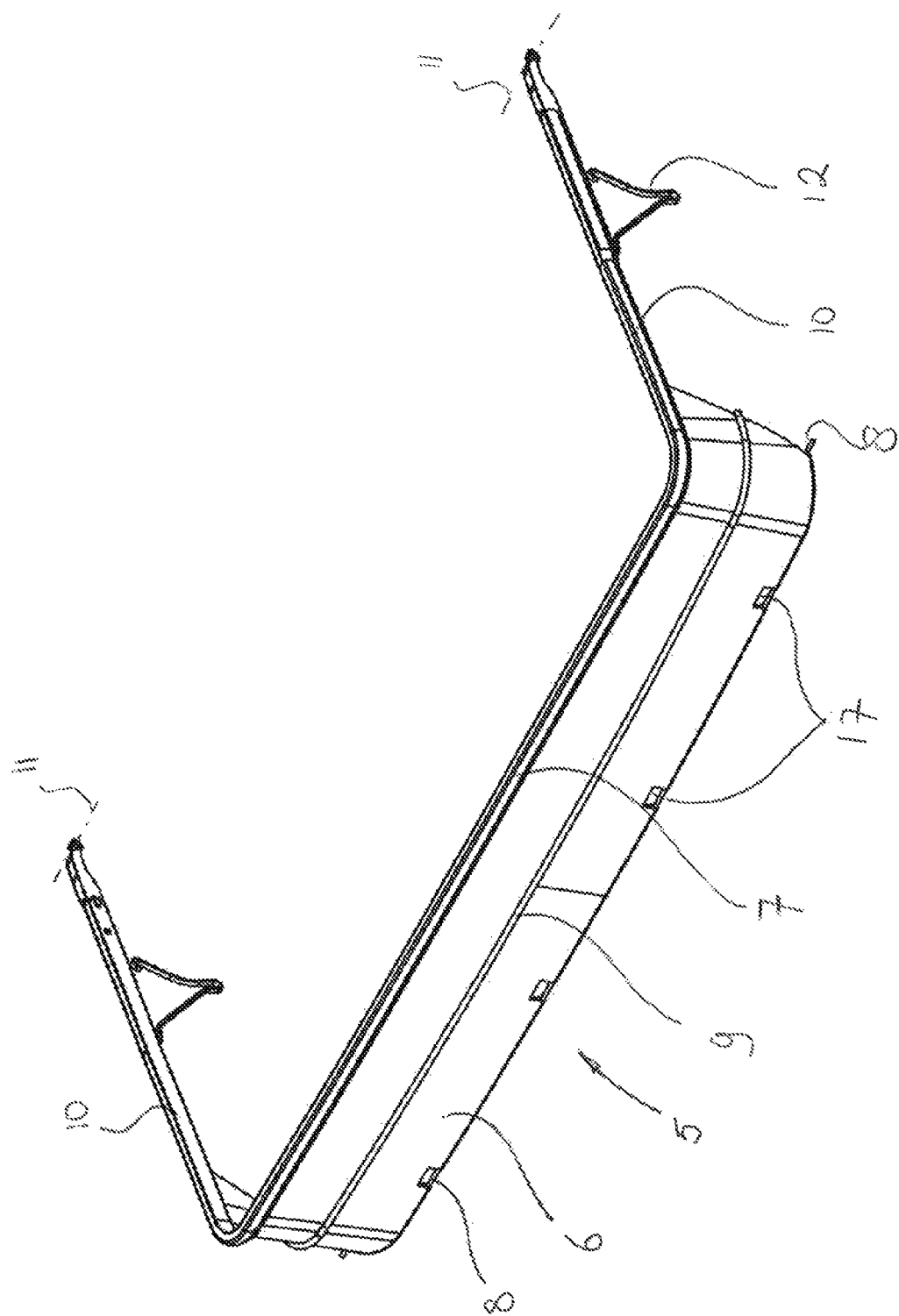
FIG. 4 is a larger scale perspective view of the wind deflector as used in the open roof construction of FIG. 1.

FIG. 4 shows the wind deflector 5 separately. It is shown that the upper elongate element 7 is connected at its lateral ends to longitudinally directed pivoting arms 10, thus extending substantially parallel to the side edges of the roof opening 2. The arms 10 or end parts of the upper elongate element 7 are attached at or near their rear ends to a transverse axis of rotation 11 to allow the arms 10 to pivot and allow the upper elongate element 7 to move between the effective and ineffective positions. Springs 12 below the arms 10 bias the arms upwardly and therefore the wind deflector 5 to its effective position. The wind deflector 5 is generally moved to its ineffective position by means of the closure panel 3 engaging the arms 10 and pushing them downwardly. Other manners are conceivable.

FIG. 4 also shows that the flexible wind deflecting material 6 extends not only substantially parallel to the front edge of the roof opening 2 but also a limited length substantially parallel to the side edges of the roof opening 2. So the flexible wind deflecting material 6 is guided around the corner. The length of these side portions varies along the height of the wind deflecting material 6. The horizontal length is at a maximum near the upper elongate element 7 and reduces in downward direction. Also the intermediate and lower elongate elements 8, 9 are attached to the longitudinal side portions of the flexible wind deflecting material 6 and thus also comprise longitudinally directed end parts.

Figure 5:
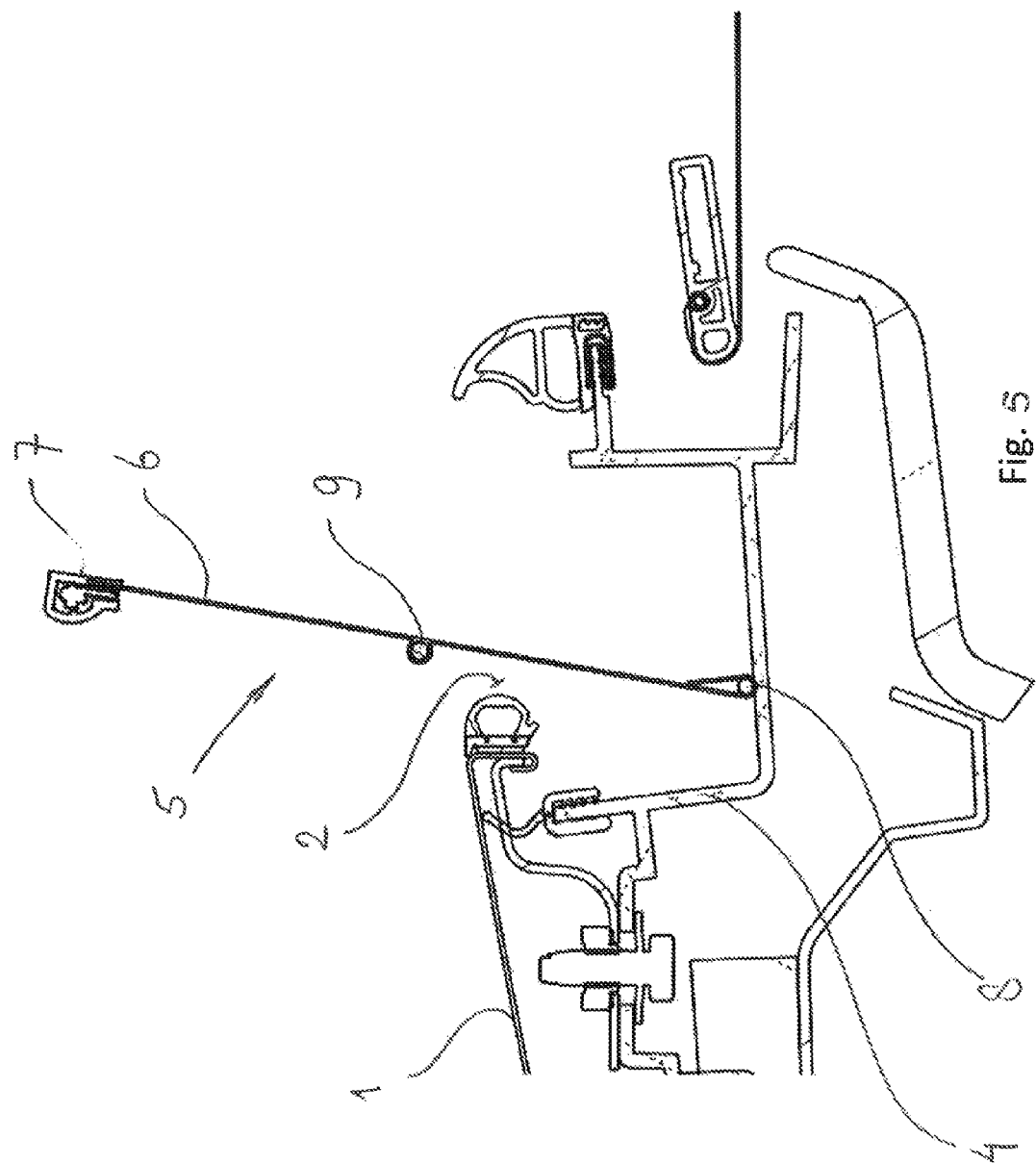
FIG. 5 is a larger scale sectional view along the lines V-V in FIG. 1.
Figure 6:
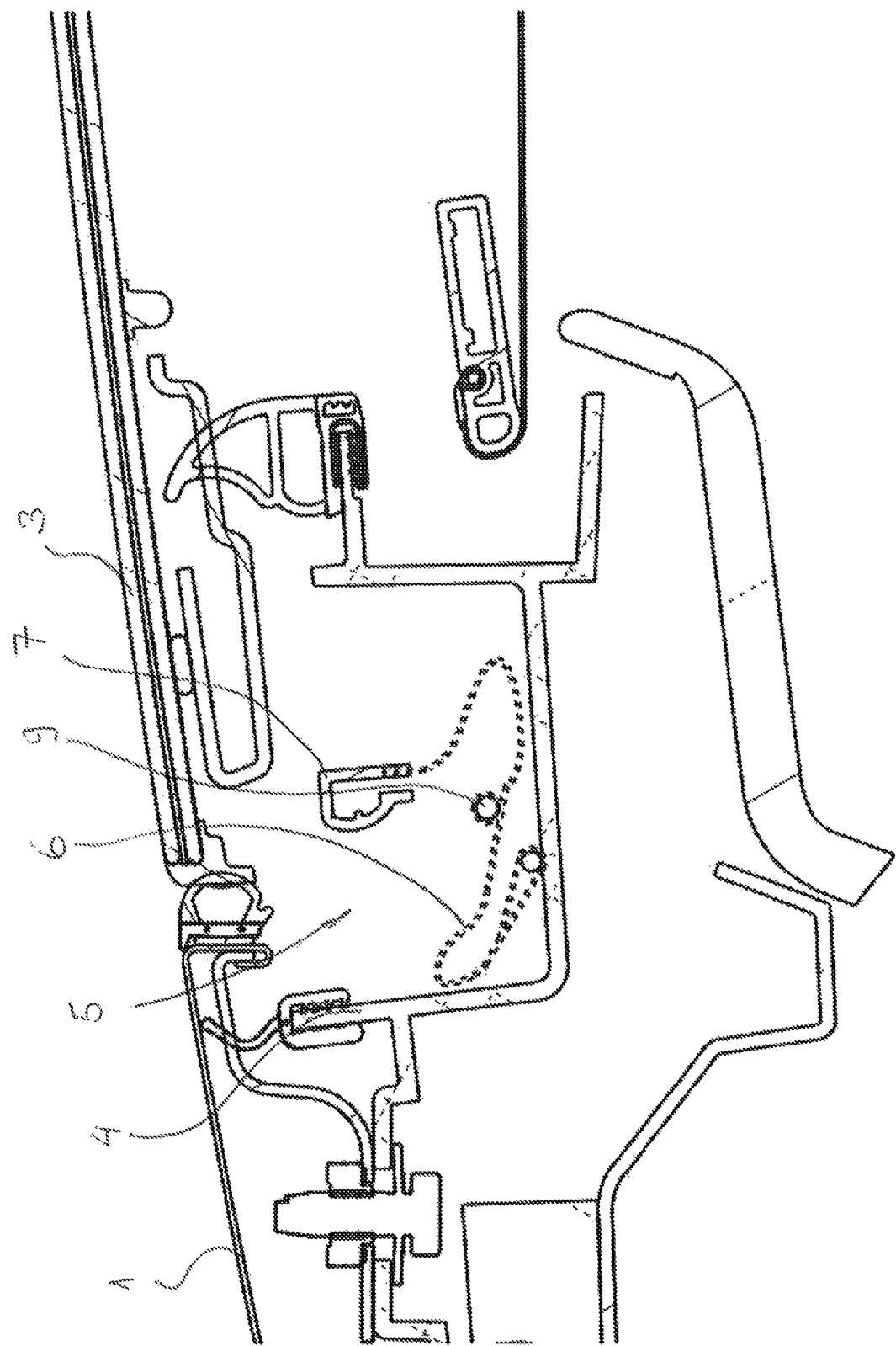
FIG. 6 is a view corresponding to that of FIG. 5, but showing the open roof construction with closure panel in its closed position and the wind deflector in its ineffective position.
Figure 7:
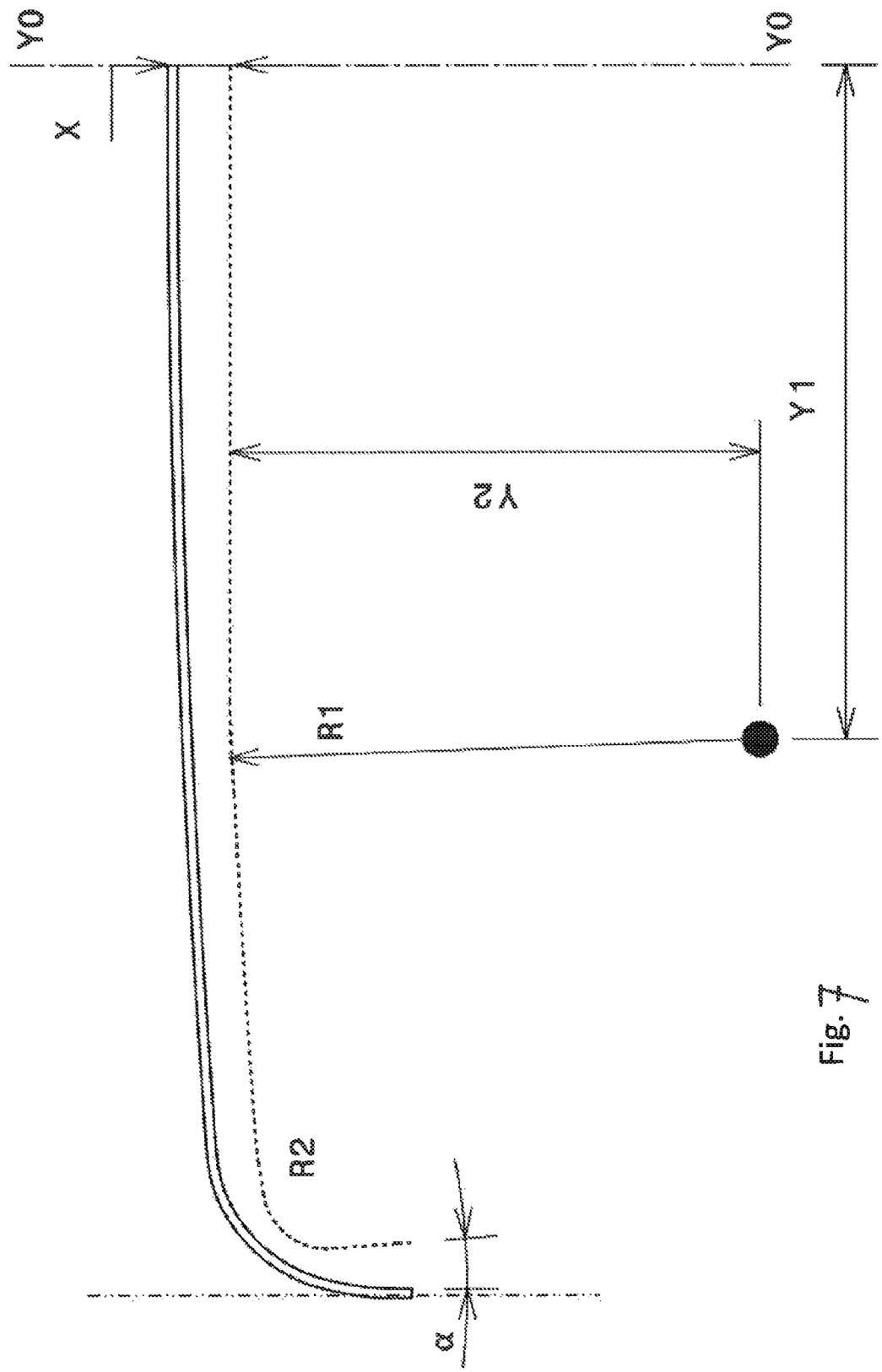
FIG. 7 is a plan view of the intermediate elongate element in its relaxed position (interrupted line) and in its position when the wind deflector is in its effective position.

FIGS. 5 and 6 show the wind deflector 5 in its effective and ineffective positions, and FIG. 7 shows in plan view the shape of the intermediate elongate element 9 in the effective position (solid lines) and ineffective position (interrupted line) of the wind deflector 5.

FIG. 5 shows that the wind deflector 5 and especially the flexible wind deflecting material 6 extends close to the front edge of the roof opening 2 and fixed roof 1 when the wind deflector 5 is in its upper, effective position. If the upper elongate element 7 would be lowered without any special measurement, the flexible wind deflecting material 6 could be folded in forward direction such that it is caught between the panel 3 and fixed roof 1. However, the intermediate elongate element 9, is configured so as to have a first shape when the wind deflector material 6 is in the ineffective position of the wind deflector (not being taut) and in a second shape when the wind deflector material 6 is in the effective position of the wind deflector (taut). The intermediate elongate element 9, or portions thereof, are configured to be resilient so as to return to the first shape after being in the second shape. In one embodiment, the intermediate material can be made of metal, such as spring steel, or another heavy material (as explained in the Summary), and is biased to the first shape according to the interrupted line in FIG. 7, and only due to the tension of the flexible wind deflecting material 6, which is stretched between the upper and lower elongate elements 7, 8, when the wind deflector material 6 is in the effective position, is the intermediate elongate element 9 deformed to the second shape as shown by the solid lines in FIG. 7, where the intermediate elongate element 9 is longer from end to end than in the first shape.

As is shown, the longitudinal end portions of the intermediate elongate element 9 rotate inwardly through angle α. Other parts of the intermediate elongate element 9 may be biased too, for example the side portions of the central transverse section of element 9. In this manner, the intermediate elongate element 9 is moved away from the edges of the roof opening 2 when the wind deflector 5 is displaced to its ineffective position, thereby reducing the risk of this material 6 being caught. FIG. 6 shows the wind deflector 5 in its ineffective position. The weight of the intermediate elongate element 9 has caused it to hold the upper part of the wind deflecting material 6 (positioned above element 9) taut during the path of lowering the upper elongate element 7, until the point that the intermediate elongate element 9 touches the bottom of the front beam, i.e. the stationary part 4. The amount of material 6 that remains between the level of the roof opening edge and upper elongate element 7 is less than without the intermediate elongate element 9, thus reducing the risk of clamping of the flexible material. This material 6 may have some rigidity, so that the weight of the intermediate elongate element 9 helps the material 6 to fold and move downward in a reliable and predetermined manner.

FIGS. 5 and 6 also show that the intermediate elongate element 9 is attached to the front side of the flexible wind deflecting material 6. It is also shown that the flexible wind deflecting material 6 is provided with one or more pockets 16 in which the intermediate elongate element 9, here in the form of a solid or hollow, metal rod or bar having a circular cross section, is accommodated. The lower elongate element 8 may be attached to the stationary part 4 using other fasteners such as by being hooked below clips, enabled by holes 17 in the flexible wind deflecting material 6.

FIG. 4 (and FIG. 8) further show that the axis of rotation 11 is positioned at such a high level (substantially at the level of the fixed roof 1 at the front edge of the roof opening 2) that it is substantially in the middle of the vertical displacement of the upper elongate element 7 meaning that the horizontal (rearward/forward) movement of the upper elongate element 7 is minimal during this vertical displacement, especially if the arms 10 are relatively long. This also enables the wind deflector 5 to be positioned at only a short distance behind the front edge of the roof opening 2, as seen in plan view, which is advantageous from a aerodynamic point of view.

Figure 8:
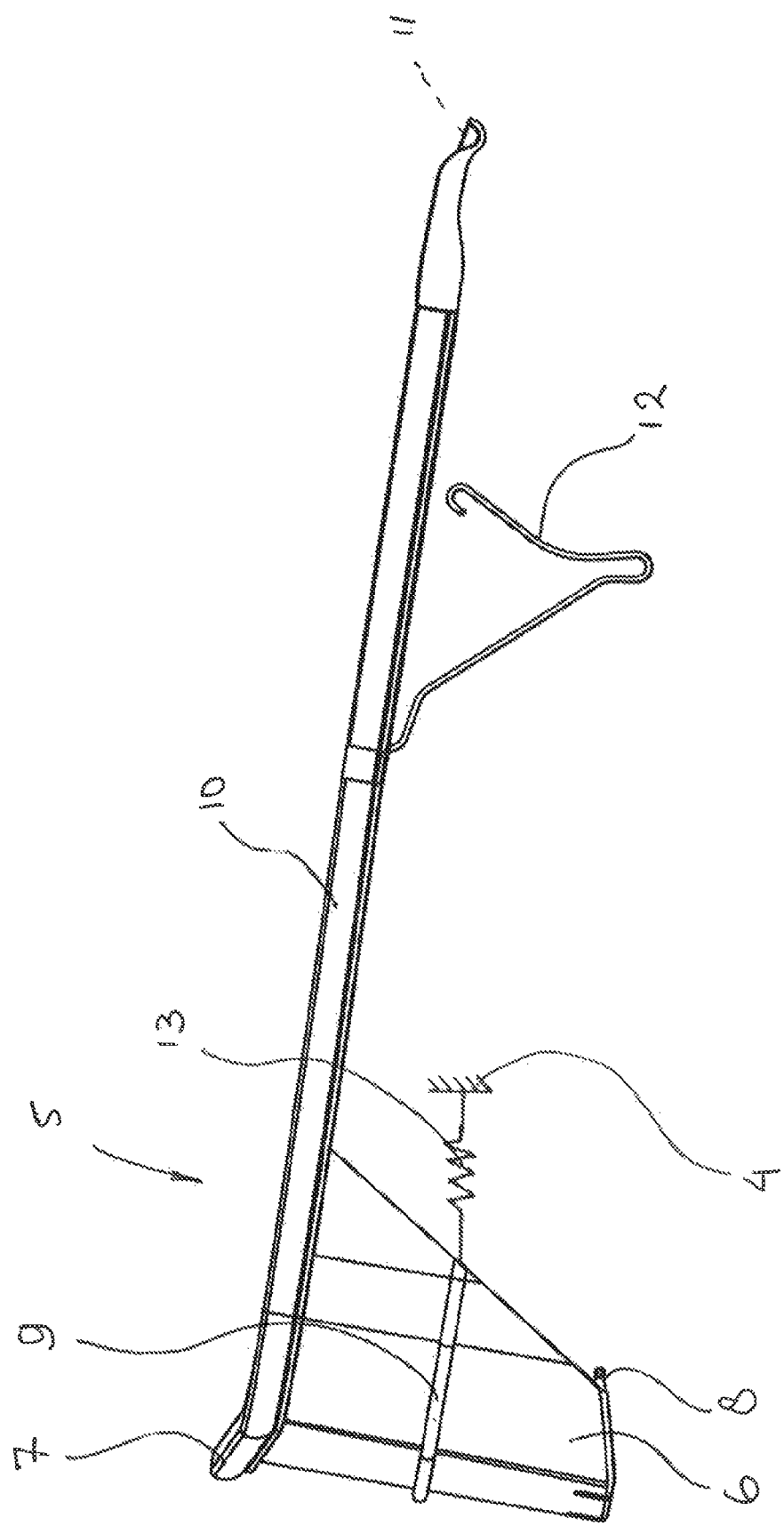
FIG. 8 is a side view of an alternative embodiment of the wind deflector.

FIG. 8 shows a further embodiment of the invention, in which the intermediate elongate element 9 is biased in another way to move it away from at least the front edge of the roof opening 2 when the wind deflector 5 is moved from the effective to the ineffective position. A very schematically indicated biasing device 13, which may be a simple spring, is connected on one end to the intermediate elongate element 9 and on the other end to either the stationary part 4 or the upper elongate element 7 to bias the intermediate elongate element 9 as a whole in rearward direction. The longitudinal end portions of the intermediate elongate element 9 may be biased as in the embodiment of FIG. 7. So, different from the former embodiment where the intermediate elongate element 9 is attached to the net only, the element 9 is now connected to another part as well.

Figure 9:
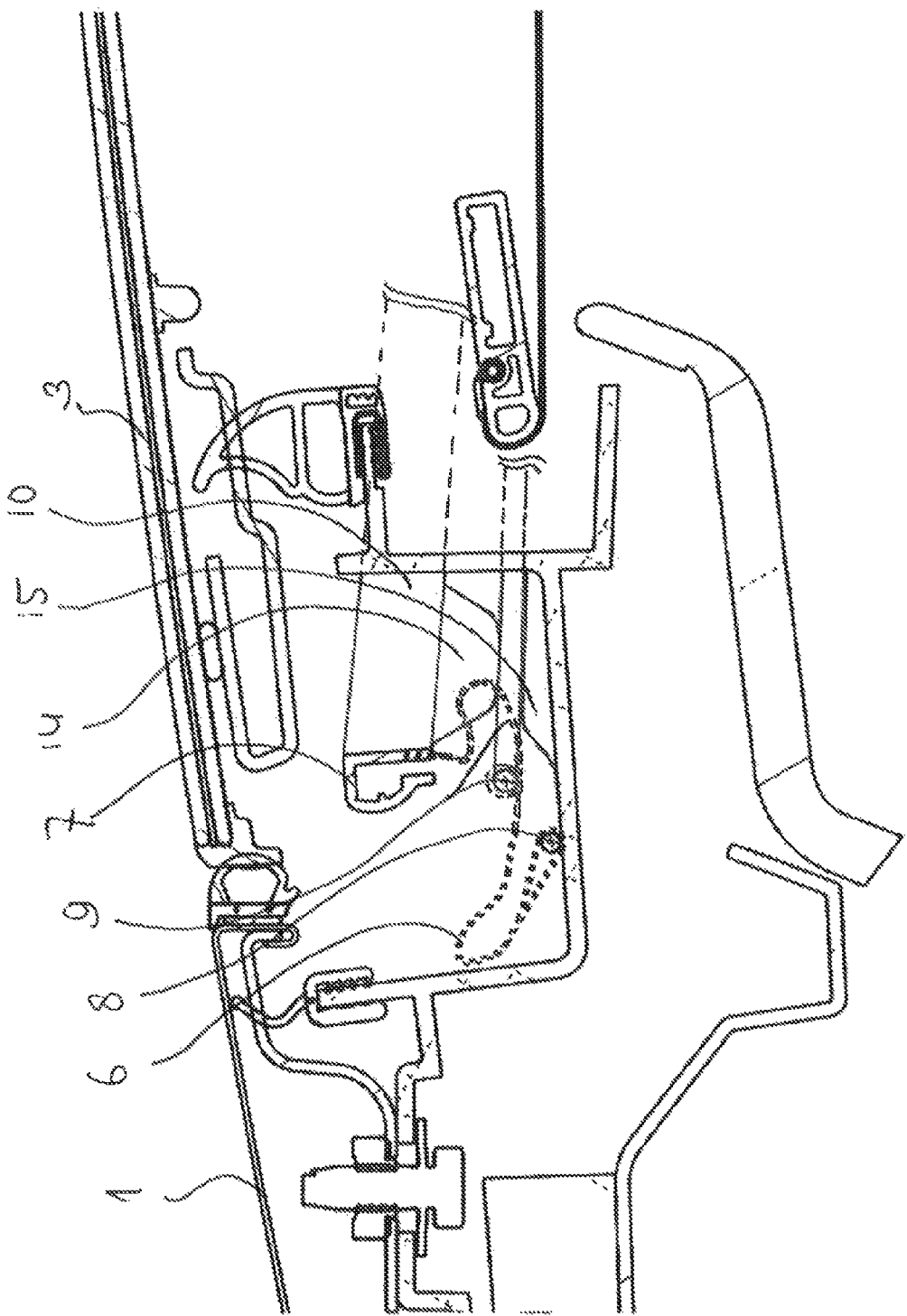
FIG. 9 is a view corresponding to that of FIG. 6, but showing another embodiment of the wind deflector.

FIG. 9 shows another embodiment in which the intermediate elongate element 9 is loaded, held, fixed, or otherwise inhibited from moving when the wind deflectors is in the ineffective position. In this case the upper elongate element 7 and the stationary part 4 (could also be only one of them) are provided with cams 14, 15 or other formations clamping the intermediate elongate element 9 between the upper elongate element 7 and the stationary part 4 to prevent rattling thereof. Both end portions of the intermediate elongate element 9 can be clamped, only one, or the intermediate elongate element 9 could be clamped in its central transverse portion. It would also be possible that the biasing device 13 of FIG. 8 is such that it holds or biases the intermediate elongate element 9 in the ineffective position of the wind deflector 5 such that rattling is prevented. The embodiments of FIGS. 8 and 9 could also be combined.

Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims. For example, the invention is also useful in open roof constructions having other closure members such as for example a folding cover. The flexible wind deflecting material could be formed from one part of material or from several parts, connected to each other, for example at the intermediate elongate element.

What is claimed is:

1. An open roof construction for a vehicle having a roof opening in its fixed roof, the roof opening having a front side and two lateral sides providing edges of the roof opening, comprising:
   a stationary part,
   at least a closure member supported by the stationary part and configured to close the roof opening in the fixed roof and to selectively open the roof opening by being moved at least rearwardly, and
   a wind deflector positioned near the front of the roof opening, said wind deflector being configured to be movable between an ineffective position below the fixed roof and an effective position projecting above the fixed roof, the wind deflector including flexible wind deflecting material attached at an upper end to an upper elongate element which is movably connected to the stationary part and configured to extend at least along the front of the roof opening and the wind deflecting material being connected at a lower end to the stationary part, the wind deflecting material being provided with an intermediate elongate element attached to the wind deflecting material between the upper and lower ends and extending along substantially the width of the wind deflecting material, wherein at least a part of the intermediate elongate element is configured so as to be biased toward a position spaced from at least one edge of the roof opening and is displaced in a direction toward the at least one edge of the roof opening when the wind deflector is moved from the ineffective position to the effective position;
   wherein the upper and intermediate elongate elements have a central part extending substantially parallel to the front side of the roof opening and end parts extending, in plan view, substantially parallel to the lateral sides of the roof opening, the flexible wind deflecting material being attached both to the central part and to the end parts of the elongate elements;
   wherein the intermediate elongate element is flexible and at least side portions of the intermediate elongate element are biased away from adjacent edges of the roof opening.

2. The open roof construction of claim 1, wherein the intermediate elongate element is urged by the flexible wind deflecting material to a shape in plan view substantially corresponding to that of the upper elongate element, when the wind deflector is in its effective position.

3. The open roof construction of claim 1, wherein the intermediate elongate element as a whole is biased in rearward direction away from a front edge of the roof opening.

4. The open roof construction of claim 3, including a biasing device engaging the intermediate elongate element.

5. The open roof construction of claim 4, wherein the biasing device is connected to at least one of the upper elongate element and the stationary part.

6. The open roof construction of claim 1, wherein the upper elongate element is attached to the stationary part such that movement of the upper elongate element brings the wind deflector from the ineffective to the effective position and causes a rearward displacement of the upper elongate element.

7. The open roof construction of claim 6, wherein the upper elongate element includes arms which are pivotable about lateral axes positioned substantially at the level of the fixed roof at the position of a front edge of the roof opening.

8. The open roof construction of claim 1, wherein the intermediate elongate element is made of a heavy material configured to maintain an upper portion of the flexible material taut above the intermediate elongate element via the weight of the intermediate elongate element.

9. The open roof construction of claim 1, wherein the intermediate elongate element is a rod.

10. The open roof construction of claim 1, wherein the intermediate elongate element is attached to the flexible wind deflecting material on the front side thereof.

11. The open roof construction of claim 1, wherein the intermediate elongate element is provided in a pocket of the flexible wind deflecting material.

12. The open roof construction of claim 1, wherein the intermediate elongate element is inhibited from moving when the wind deflector is in its ineffective position to avoid rattling thereof.

13. An open roof construction for a vehicle having a roof opening in its fixed roof, comprising:
   a stationary part,
   at least a closure member supported by the stationary part and configured to close the opening in the fixed roof and to selectively open the roof opening by being moved rearwardly, and
   a wind deflector positioned near the front of the roof opening, said wind deflector configured to be movable between an ineffective position below the fixed roof and an effective position projecting above the fixed roof, the wind deflector including flexible wind deflecting material attached at an upper end to an upper elongate element which is movably connected to the stationary part and configured to extend at least along the front of the roof opening and the wind deflecting material being connected at a lower end to the stationary part, the wind deflecting material being provided with an intermediate elongate element attached to the wind deflecting material between the upper and lower ends and extending along substantially the width of the wind deflecting material, the intermediate elongate element being made of metal and being attached to the wind deflecting material only.

14. Open roof construction for a vehicle having a roof opening in its fixed roof, comprising:
   a stationary part,
   at least a closure member supported by the stationary part and configured to close the opening in the fixed roof and to selectively open the roof open by being moved rearwardly, and
   a wind deflector configured to be positioned near the front of the roof opening and configured to be movable between an ineffective position and an effective position projecting above the fixed roof, the wind deflector comprising:
   an upper elongate element which is movably connected to the stationary part;
   a flexible wind deflecting material attached at the upper elongate element and configured to extend at least along a front of the roof opening, a lower end of the wind deflecting material being connected to the stationary part, the wind deflecting material being taut in the effective position and folded in the ineffective position; and
   an intermediate elongate element attached to the wind deflecting material between the upper and lower ends and extending along substantially the width of the wind deflecting material, the intermediate elongate element being configured so as to have a first shape when the wind deflector material is in the ineffective position of the wind deflector and in a second shape when the wind deflector material is in the effective position.

15. The open roof construction of claim 14 wherein the intermediate elongate element is resilient.

16. The open roof construction of claim 15 wherein the intermediate elongate element is resiliently deformed from the first shape to achieve the second shape.

17. The open roof construction of claim 16 wherein the intermediate elongate element is longer from end to end in the second shape.

18. The open roof construction of claim 16 wherein the intermediate elongate element is made of a spring material.

19. An open roof construction for a vehicle having a roof opening, having a front edge, in its fixed roof, comprising:
   a stationary part,
   at least a closure member supported by the stationary part and configured to close the roof opening in the fixed roof and to selectively open the roof opening by being moved at least longitudinally rearwardly from the front edge, and
   a wind deflector positioned near the front of the roof opening, said wind deflector being configured to be movable between an ineffective position below the fixed roof and an effective position projecting above the fixed roof, the wind deflector including flexible wind deflecting material attached at an upper end to an upper elongate element which is movably connected to the stationary part and configured to extend at least along the front of the roof opening and the wind deflecting material being connected at a lower end to the stationary part, the wind deflecting material being provided with an intermediate elongate element attached to the wind deflecting material between the upper and lower ends and extending along substantially the width of the wind deflecting material, wherein at least a part of the intermediate elongate element is configured so as to be biased toward a position spaced from the front edge of the roof opening and is displaced longitudinally in a direction toward the front edge of the roof opening when the wind deflector is moved from the ineffective position to the effective position.

20. The open roof construction of claim 19, wherein the intermediate elongate element is urged by the flexible wind deflecting material to a shape in plan view substantially corresponding to that of the upper elongate element, when the wind deflector is in its effective position.

* * * * *